Patented Jan. 2, 1945

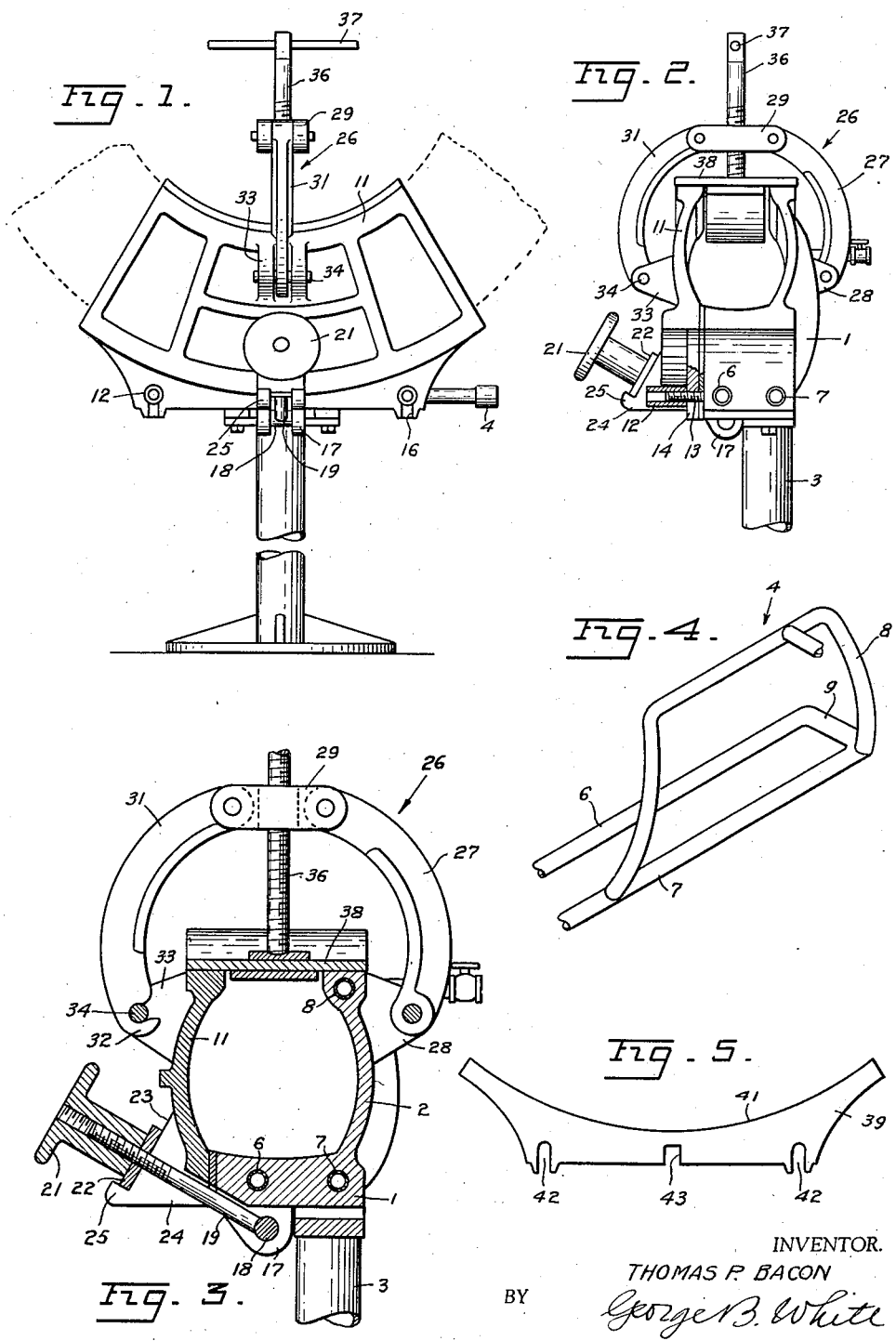

2,366,308

UNITED STATES PATENT OFFICE 2,366,308

TIRE REPAIR VULCANIZER

Thomas P. Bacon, Oakland, Calif.

Application December 7, 1942, Serial No. 468,318

7 Claims. (Cl. 18—18)

This invention relates to vulcanizing apparatus and particularly to tire repair vulcanizers.

An object of this invention is to provide a repair vulcanizer in which the heat can be localized to either side of the tread of the tire.

Another object of this invention is to provide a repair vulcanizer, the tread width of which can be easily adjusted to fit tires of various tread width.

Another object of this invention is to provide a repair vulcanizer, a side of which can be swung or tilted into such a position as to permit the insertion of a tire to the tread portion of the other side of the mold; means being provided for securely clamping the meeting edges of this movable mold side and the tread portion of the mold together, and means being provided for clamping the bead portions of the sides of the mold together, and to exert pressure on the free ends of said sides.

Another object of this invention is to provide a repair vulcanizer which is highly useful and simple in construction. Convenience of arrangement, lightness and comparative inexpense of manufacture are further objects which have been borne in mind in the production and development of the invention.

It will be understood that various changes in the details of construction may be made without departing from the spirit or scope of the invention as defined by the appended claims.

With the foregoing and other objects in view, which will be made manifest in the following detailed description, reference is had to the accompanying drawing for the illustrative embodiment of the invention, wherein:

Fig. 1 is a side view of a vulcanizer constructed in accordance with my invention.

Fig. 2 is an end view of said vulcanizer.

Fig. 3 is a cross sectional view of said vulcanizer.

Fig. 4 is a perspective detail view of the heating conduits in the tread portion and fixed sides of the vulcanizer, and Fig. 5 is a side view of a spacer for changing the tread width of the vulcanizer.

In carrying out my invention, I make use of a mold shaped so as to conform to the curvature of a segment of a tire. A longitudinally arcuate tread mold 1 has integrally united therewith a side mold portion 2 which form a single body conforming to the usual tread and one side wall of a tire. The tread portion 1 is detachably bolted to a pedestal stand 3, so that it can be easily mounted in position or detached from the stand 3. The tread portion 1 and the fixed side 2 are cast preferably of suitable light weight material. A set of pipes 4, shown in Fig. 4, is arranged so that two pipes 6 and 7 thereof substantially conform to the area of the tread portion 1 of the mold, and a substantially U-shaped extension conduit 8 extends upwardly from one of the pipes 7 and is so curved as to conform to the shape of the fixed mold side 2. The pipes 6 and 7 are united by a short cross connection 9 so as to provide for the circulation of a heating medium inside through one of the pipes and out through the other. This system of conduits is an inner skeleton frame around which the tread portion 1 and the fixed mole side 2 are cast so as to form an integral unit.

A movable side 11 forms the other side of the mold so as to define with the mold body a tire receiving channel. A pair of aligning projections extend from the sides of the tread portion of one of the molds under the removable side 11. Each of these projections is formed by a fixed stud 13 which is treaded, and on which is adjustably held a securing knob or bushing 12.

An aligning flange 14 extends from the lower edge of the movable side 11 and it has aligning notches 16 in its lower edge, which fit over the aligning studs 13 so as to hold the movable side 11 in proper opposite relation to the fixed mold side 2.

A lug 17 is extended from the bottom of the tread portion 1 and accommodates a pivot shaft 18 on which latter is pivoted a clamping stem 19. The outer end of the stem 19 is threaded, and a clamping nut 21 is screwed on the free end of the stem 19 so as to engage through a washer plate 22 the downwardly and outwardly inclined face 23 of bearing bosses 24 on the lower portion of the movable mold side 11. The stem 19 projects between the pair of bearing bosses 24. It is to be noted that this mold locking device exerts a pressure directed toward the tread portion 1 of the mold so as to exert the greater force at the meeting edges of the movable side mold 11 and the tread portion of the mold 1. By this mold clamping device, a complete and continuous mold is accomplished, although the side 11 can be moved away from the mold body at will. On the lower and outer edges of each inclined boss face 23 is provided a ledge 25 which supports the washer plate 22 so as to prevent downward swinging of the clamping stem 19. This connection between the ledges 25 and the washer plate 22 also facilitates the holding of the movable side 11 in a loose outwardly tilted position while the tire is placed into the mold.

A pressure clamp 26 is provided on the top of the mold. This pressure clamp includes a lever 27 pivoted at one end on a bracket 28, which latter extends outwardly from the fixed mold side 2 near the upper or bead edge of said mold side 2 and substantially in the middle with respect to the length of the mold segment. A short link 29 is pivoted to the free end of the lever 27 so that the center of the link 29 is opposite the center line of the tread mold 1 of the mold. To the other end of the link 29 is pivoted a clamping arm 31, in the free end of which is a hook 32. From the outer face of the movable mold side 11, adjacent to its bead portion and at about the middle with respect to the length of the mold segment, is extended another pair of brackets 33, which hold therebetween a pin 34. The hook 32 in the end of the lever 31 engages the pin 34 between the brackets 33. The fulcrum of the lever 27 and the pin 34 are substantially opposite one another. Through the center of the link 29 is threaded a pressure screw 36 with a suitable cross bar or handle 37 at its top. This pressure screw 36 bears against a plate 38, which latter extends across the bead edges of the mold sides 2 and 11. The pressure exerted by the screw 36 pulls the link 29 upwardly, which action in turn forces the hook end of the lever arm 31 toward the fixed mold side 2 for securely holding the movable side 11 in position.

The width of this vulcanizer is made adjustable by the use of suitable tread spacers 39. Each of these tread spacers 39 consists of a comparatively narrow and light plate, the concave edge 41 of which is of the same curvature as the inner surface of the tread portion 1 of the mold along the length of the segment. The contour of each tread spacer 39 conforms substantially to the contour of the aligning flange 14 on the lower edge of the movable mold side 11. The lower edge of each tread spacer 39 has a notch 42 at each end thereof which fits over the aligning studs 13. At about the middle of the lower edge of each tread spacer 39 is another recess 43 which fits over the locking stem 19. In this manner each tread spacer can be quickly and positively aligned with the longitudinal edge of the tread portion 1 of the mold.

In operation, the pressure clamp screw 36 is loosened so that the hook 34 of the arm 31 can be disengaged from the pin 34. Then the pressure clamp is swung around the pivot of the arm 27 to an out of way position, then the lower clamping nut 21 is loosened so as to allow the tilting of the movable mold side 11 outwardly to a sufficient distance to permit the insertion of a tire to be cured into the mold. The side and tread portion of the tire to be repaired are prepared in the usual manner. The portion of the tire to be repaired is placed so that the sides and the tread on which the heat is required are in the angular space formed by the tread portion 1 and the fixed side 2 of the mold. Then the movable side 11 of the mold is lifted against the outer side of the tire and is locked in position by tightening the clamping nut 21.

Usually a resiliently compressible curing pad or an inflatable curing bag is placed inside of the tire for pressing the sides and tread of the tire against the respective portions of the mold. The pressure plate 38 is curved correspondingly to the inner edges of the mold and is placed over the bead edges of the mold sides. Then the pressure clamp is swung over the inside of the tire so that its hook 32 is hooked over the pin 34. The pressure screw 36 is then turned against the pressure plate 38 so that it pries the link 29 upwardly away from the mold, thereby firmly clamping the upper edges of the mold sides in position and also exerting on the pressure plate toward the mold. Finally the heat is turned on so that the heating medium circulates through the conduits 6, 7, 8 and 9, for a suitable time and at a suitable temperature for the vulcanizing of new rubber upon the portion of the tire in contact with the tread portion 1 and fixed side 2 of the mold.

In order to accommodate tires of larger width in the same mold, it is only necessary that, before the insertion of the tire, the movable side 11 of the mold be swung outwardly and pulled into a position to allow the insertion between its lower end and the tread portion 1, of one or more tread spacers 39, according to the width desired. After the tread spacers are inserted in place, then the operation of the mold is the same as heretofore described.

I claim:

1. A tire repair vulcanizer, comprising a bottom member and two sides defining a channel to receive the tire to be repaired, one of said sides being fixed, the other side being removable, means to heat the bottom member and the fixed side of the mold, said movable side extending beyond the bottom of said channel and over the adjacent side of said bottom member, swingable means on said adjacent side of said bottom member to engage the extended portion of said movable side, releasable means on said swingable means to tighten said extended portion of said movable side against said bottom member, and means to press the top of the movable side toward the fixed side and into tire engaging position.

2. A tire repair vulcanizer comprising a longitudinally arcuate bottom member, a fixed side extended from one longitudinal edge of the bottom member, a movable side opposite said fixed side defining with said bottom member and fixed side a tire receiving cavity, said movable side being extended over the outside face of the bottom member, means to hold said movable side in place, spacer elements insertable between the movable side and the outside face of the bottom member, each of said spacer elements conforming at an edge thereof to the longitudinal arcuate form of the bottom of the cavity at the movable side, and coacting means on the bottom member and on the inserts to align said inserts with the inner surface of the bottom member.

3. A tire repair vulcanizer, comprising a longitudinally arcuate bottom member, a fixed side extended from one longitudinal side of said bottom member, a movable side extended from the outside face of the other side of said bottom opposite said first side so as to define a tire receiving channel with said bottom member and fixed side, said movable side extending over the outside face of the bottom member below said channel, a pair of aligning elements extended from the outside face of the bottom member through said movable side, releasable means to hold the lower portion of said movable side in place against the bottom member, said movable side having aligning notches therein for engagement with said aligning elements so as to locate the movable side in operative position, and means to press the top of the movable side toward the fixed side.

4. In a tire repair vulcanizer, a bottom member and two sides forming a tire receiving channel, one of the sides being movable and extending below said channel and over one side of the bottom member, clamping means for holding the movable side in place including a clamping shaft pivoted to the bottom member below said movable side so as to be swingable from the bottom member to the outside of the movable side, a pair of projections on the outside face of the movable side, said shaft being swingable to a position between said projections, and a clamping head adjustable on the free end of the shaft to engage said projections for clamping the movable side in place.

5. In a tire repair vulcanizer, a bottom member and two sides forming a tire receiving channel, one of the sides being movable and extending below said channel and over one side of the bottom member, clamping means for holding the movable side in place, including a clamping shaft pivoted to the bottom member below said movable side so as to be swingable from the bottom member to the outside of the movable side, a pair of projections on the outside face of the movable side, said shaft being swingable to a position between said projections, a clamping head adjustable on the free end of the shaft to engage said projections for clamping the movable side in place, the faces of said projections engaged by said clamping head being inclined outwardly and downwardly from the movable side, a retaining ledge on the outer edge of each of said inclined faces, and means on the clamping shaft to rest on said ledges so as to hold the clamping means on the movable side.

6. A tire repair vulcanizer, comprising a bottom member and two sides defining a channel to receive the tire to be repaired, one of said sides being fixed, the other side being movable and extending below the channel and over the outside of said bottom member, means to heat the bottom and fixed side of the mold, releasable means to hold the lower portion of the movable side against the bottom member said movable side being tiltable when said releasable means is released so as to tilt its top outwardly and widen said channel, and means to press the top of the movable side toward the fixed side and into tire engaging position, said top pressing means comprising a pair of levers, a link pivotally connecting said levers, said levers being of such length as to locate the link substantially above the vulcanizer channel, one of said levers being pivoted on the fixed side, a hook in the free end of the other lever, means on the outside near the top of the movable side to be engaged by the hook, a pressure element threaded through said link, and a member on the end of the pressure element nearer to the vulcanizer to transmit pressure from the pressure element to the top of the sides so that said element exerts an upward pull on the link and pull the hooked end of said second lever against said movable side.

7. In a tire vulcanizer of the character described, a body including a tread portion, a fixed side, and a heating system inside said tread portion and fixed side; a movable side opposite said fixed side for forming a side of a tire receiving channel above said tread portion, spacer inserts insertable between the movable side and said tread portion so as to supplement the inner surface of the tread portion to widen the tire receiving channel, aligning means for locating said movable side and said inserts in alignment with said tread portion, releasable pressure clamping means pivoted on the fixed side, detachably engaging the movable side and extending over the tops of said movable side and fixed side so as to exert adjustable pressure inwardly toward the channel between said movable side and fixed side, and releasable means to hold the lower portion of the movable side against the outside face of said body.

THOMAS P. BACON.